United States Patent
Kyoung

(10) Patent No.: US 10,429,557 B2
(45) Date of Patent: Oct. 1, 2019

(54) OPTICAL FILTER AND ELECTRONIC DEVICE INCLUDING THE SAME

(71) Applicant: SAMSUNG ELECTRONICS CO., LTD., Suwon-si (KR)

(72) Inventor: Jisoo Kyoung, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 259 days.

(21) Appl. No.: 15/083,745

(22) Filed: Mar. 29, 2016

(65) Prior Publication Data

US 2017/0097451 A1   Apr. 6, 2017

(30) Foreign Application Priority Data

Oct. 6, 2015 (KR) .................. 10-2015-0140611

(51) Int. Cl.
*G02B 5/28* (2006.01)
*G02B 1/00* (2006.01)
*G02B 5/20* (2006.01)
*G02B 5/00* (2006.01)
*G02B 5/18* (2006.01)

(52) U.S. Cl.
CPC ............ *G02B 5/285* (2013.01); *G02B 1/002* (2013.01); *G02B 5/204* (2013.01); *G02B 5/286* (2013.01); *G02B 5/008* (2013.01); *G02B 5/1809* (2013.01); *G02B 5/208* (2013.01)

(58) Field of Classification Search
CPC ........ G02B 1/002; G02B 5/204; G02B 5/285; G02B 5/286; G02B 5/208; G02B 5/288; G02B 5/008; G02B 5/1809
See application file for complete search history.

(56) References Cited

U.S. PATENT DOCUMENTS

| 5,646,781 | A | 7/1997 | Johnson, Jr. | |
|---|---|---|---|---|
| 8,995,055 | B1 | 3/2015 | Feng | |
| 2004/0134879 | A1 | 7/2004 | Kochergin et al. | |
| 2006/0007547 | A1 | 1/2006 | Kamikawa | |
| 2011/0188807 | A1* | 8/2011 | Fattal ................ | G02B 6/124 385/37 |
| 2013/0032702 | A1* | 2/2013 | Le Perchec ........ | G02B 5/208 250/226 |

(Continued)

FOREIGN PATENT DOCUMENTS

JP        2006-23601 A        1/2006

OTHER PUBLICATIONS

D. C. Adams et al., "Epsilon-near-zero enhanced light transmission through a subwavelength slit", Physical Review B 89, 125119, Mar. 21, 2014.*

(Continued)

*Primary Examiner* — William R Alexander
*Assistant Examiner* — Ephrem Z Mebrahtu
(74) *Attorney, Agent, or Firm* — Sughrue Mion, PLLC

(57) ABSTRACT

A multi-band pass filter may include a filter layer including a plurality of different epsilon-near-zero (ENZ) material layers that are sequentially arranged; and an aperture-defining layer that is disposed on the filter layer and comprises at least one aperture. The filter layer may be exposed to incident light through the at least one aperture, and may be configured to pass a plurality of wavelength regions of the incident light.

21 Claims, 21 Drawing Sheets

(56) References Cited

U.S. PATENT DOCUMENTS

2017/0338567 A1* 11/2017 Puscasu ............... H01Q 15/006

OTHER PUBLICATIONS

Liu et al., "Multi-passband Tunneling effect in Multilayered Epsilon-Near-Zero Metamaterials", 6 Jul. 2009/vol. 17, No. 14/ Optics Express 12188.*

S. Inampudi et al. "Epsilon-near-zero enhanced light transmission through a subwavelength slit" Physical Review B 89, pp. 125119-1-125119-10, Mar. 2014. (Year: 2014).*

D.C. Adams et al., "Funneling Light through a Subwavelength Aperture with Epsilon-Near-Zero Materials", Physical Review Letters, American Physical Society, September 2011, PRL 107, 133901, (133901-1-133901-5, 5 Pages Total), XP55337873, DOI: 10.1103/PhysRevLett.107.133901.

Andrea Alu et al., "Epsilon-near-zero metamaterials and electromagnetic sources: Tailoring the radiation phase pattern", Physical Review B 75, 155410 (2007), The American Physical Society (pp. 155410-1-155410-13, 13 pages Total), XP55337872, DOI: 10.1103/PhysRevB.75 155410.

Junghyun Park et al., "Electrically Tunable Epsilon-Near-Zero (ENZ) Metafilm Absorbers", Scientific Reports, 5:15754, (2015), (9 Pages Total), XP55337894, DOI: 10.1038/srep15754.

Communication dated Feb. 2, 2017, issued by the European Patent Office in counterpart European Application No. 16168706.6.

Byung-Mun Kim et al., "A Novel Epsilon Near Zero Tunneling Circuit Using Double-Ridge Rectangular Waveguide", Journal of Electromagnetic Engineering and Science, vol. 14, Issue 1, (15 pages total), Mar. 2014.

B. Lopez-Garcia et al., "Half Mode Microwave Filters Based on Epsilon Near Zero and Mu Near Zero Concepts", Progress in Electromagnetics Research, vol. 113, pp. 379-393, 2011.

Alonso Corona-Chavez et al., "Novel Microwave Filters Based on Epsilon Near Zero Waveguide Tunnels", Microwave and Optical Technology Letters, vol. 53, No. 8, pp. 1706-1710, Aug. 2011.

* cited by examiner

OPTICAL FILTER AND ELECTRONIC DEVICE INCLUDING THE SAME

CROSS-REFERENCE TO RELATED APPLICATION

This application claims priority from Korean Patent Application No. 10-2015-0140611, filed on Oct. 6, 2015 in the Korean Intellectual Property Office, the disclosure of which is incorporated herein by reference in its entirety.

BACKGROUND

1. Field

Apparatuses and methods consistent with exemplary embodiments relate to optical filters and electronic devices, and more particularly, to multi-band pass filters and electronic devices including the multi-band pass filters.

2. Description of the Related Art

In general, a band pass filter may be manufactured by alternately stacking a dielectric layer having a high refractive index and a dielectric layer having a low refractive index in a repeated manner. The passband of the band pass filter may be calculated by using a transfer matrix based on a Fresnel coefficient.

However, a band pass filter according to the related art uses a large number of relatively thick dielectric layers and thus has a large thickness of several tens of millimeters (mm). Such a filter structure may not be suitable for small and thin handheld devices. Also, the thicknesses and number of stacked layers of the band pass filter according to the related art should be very precisely controlled to secure high performance such as a high transmittance. Thus, it may be difficult and complex to design the band pass filter according to the related art, and an independent design process may be required according to a target transmittance wavelength. Furthermore, it may be difficult to manufacture a multi-band pass filter by using the band pass filter according to the related art.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide high-performance multi-band pass filters. The multi-band pass filters may have a thin thickness and may be easily designed.

Further, one or more exemplary embodiments provide multi-band pass filters including epsilon-near-zero (ENZ) material.

Further still, one or more exemplary embodiments provide multi-band pass filters to which an 'addition rule (plus rule)' for transmittance wavelengths is applied.

Further still, one or more exemplary embodiments provide electronic devices or optical devices including the multi-band pass filters.

According to an aspect of an exemplary embodiment, there is provided a multi-band pass filter including: a filter layer comprising a plurality of different epsilon-near-zero (ENZ) material layers that are sequentially arranged; and an aperture-defining layer that is disposed on the filter layer and comprises at least one aperture, wherein the filter layer is exposed to incident light through the at least one aperture, and is configured to pass a plurality of wavelength regions of the incident light.

A sum of a thickness of the filter layer and a thickness of the aperture-defining layer may be less than a wavelength of the incident light.

The plurality of wavelength regions may be differentiated from a peak point included in each of the plurality of wavelength regions.

The plurality of ENZ material layers may have resonance frequencies different from each other.

The plurality of ENZ material layers may have ENZ wavelengths different from each other.

At least one among the plurality of ENZ material layers may be a single material layer.

At least one among the plurality of ENZ material layers may include a meta-material.

At least one among the plurality of ENZ material layers may include two or more types of two-dimensional materials.

Each of the plurality of ENZ material layers may has a thickness of, for example, about 10 nm to about 1000 nm.

The plurality of ENZ material layers may include a first ENZ material layer that has a first thickness and a first resonance frequency; and a second ENZ material layer that has a second thickness less than the first thickness and a second resonance frequency greater than the first resonance frequency, and wherein the first resonance frequency and the second resonance frequency correspond to at least two peak points of the plurality of wavelength regions.

The at least one aperture may have a width less than a wavelength of the incident light.

The at least one aperture may include a plurality of slits.

Each of the plurality of slits has a width within a range between about 5 nm and about 1000 nm. A distance between two adjacent silts of the plurality of slits may be within a range between about 1 μm and about 10 μm.

The aperture-defining layer may include a metal or a metallic material.

The aperture-defining layer may have a thickness of, for example, about 30 nm to about 300 nm.

The plurality of ENZ material layers may be sequentially stacked on a substrate, and the aperture-defining layer may be disposed on the plurality of ENZ material layers. The substrate may have a substantially constant refractive index in the plurality of wavelength regions of the incident light.

According to an aspect of another exemplary embodiment, an electronic device includes the above-described multi-band pass filter.

According to an aspect of another exemplary embodiment, a multi-band pass filter includes a filter including a plurality of material layers that are sequentially arranged, wherein the plurality of material layers include a first material layer and a second material layer, the first material layer being configured to transmit light of a first wavelength band, the second material layer being configured to transmit light of a second wavelength band which is different from the first wavelength band, and wherein the filter is configured to transmit light of a multiple wavelength bands comprising the first wavelength band and the second wavelength band.

At least one among the plurality of material layers may include an epsilon-near-zero (ENZ) material.

The plurality of material layers may include a plurality of different ENZ material layers, wherein the first material layer may be a first ENZ material layer, and the second material layer may be a second ENZ material layer.

The first material layer may have a first thickness, and the second material layer may have a second thickness which is less than the first thickness, and the first material layer may have a first resonance frequency, and the second material layer may have a second resonance frequency which is greater than the first resonance frequency. The first resonance frequency and the second resonance frequency may correspond to a peak point of the first wavelength band and a peak point of the second wavelength band, respectively.

The plurality of material layers may include three or more material layers.

The multi-band pass filter may further include an aperture-defining layer is disposed on the filter and including at least one aperture.

The at least one aperture may include a plurality of slits.

The aperture-defining layer may include a metal or a metallic material.

The plurality of material layers may be sequentially stacked on a substrate, and the aperture-defining layer may be disposed on the plurality of material layers. The substrate may have a substantially constant refractive index in the first wavelength band and the second wavelength band.

According to an aspect of another exemplary embodiment, an electronic device includes the above-described multi-band pass filter.

BRIEF DESCRIPTION OF THE DRAWINGS

The and/or other aspects will be more apparent by describing certain exemplary embodiments, with reference to the accompanying drawings in which.

DETAILED DESCRIPTION

Figure 1:
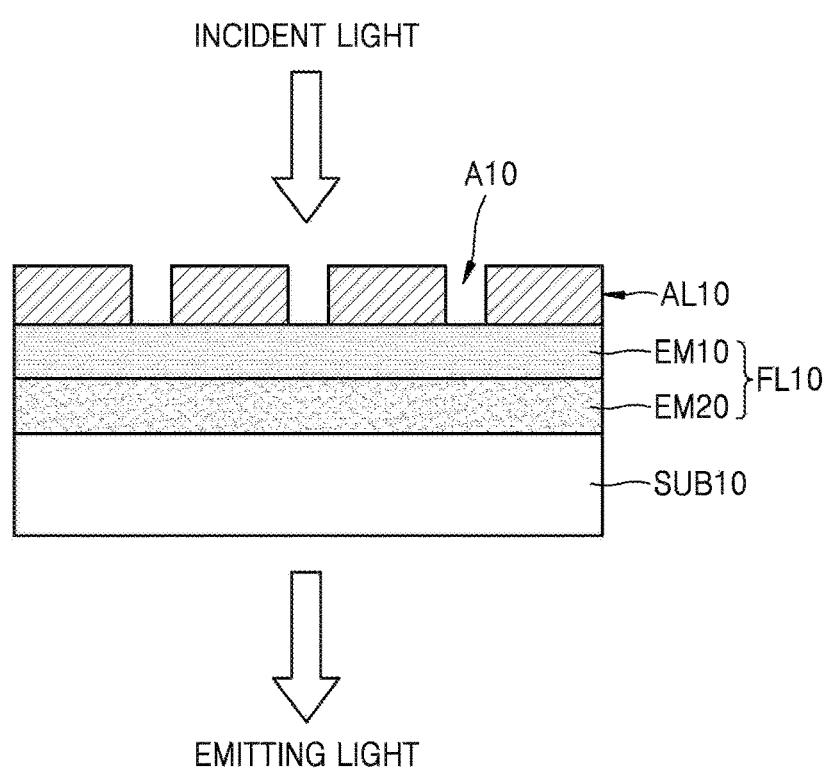
FIG. 1 is a cross-sectional view of a multi-band pass filter according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of exemplary embodiments. As used herein, the singular forms "a," "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used herein, the term 'and/or' includes any and all combinations of one or more of the associated listed items. Expressions such as 'at least one of,' when preceding a list of elements, modify the entire list of elements and do not modify the individual elements of the list.

Hereinafter, optical filters and electronic devices including the optical filters according to various exemplary embodiments will be described in detail with reference to the accompanying drawings. The widths and thicknesses of layers or regions shown in the drawings may be exaggerated for clarity and convenience of explanation. Throughout the present disclosure, the same reference numerals denote the same elements.

FIG. 1 is a cross-sectional view of a multi-band pass filter according to an exemplary embodiment.

Referring to FIG. 1, the multi-band pass filter may include a filter layer FL10 having a multi-layer structure. The filter layer FL10 may be located on a substrate SUB10. The filter layer FL10 may include a plurality of different material layers EM10 and EM20. For example, the material layers EM10 and EM20 may include a first material layer EM10 and a second material layer EM20. The filter layer FL10 may have a surface on which light is incident (hereinafter referred to as a 'light-incident surface') and a surface from which light is emitted (hereinafter referred to as a 'light-exit surface'). The plurality of material layers EM10 and EM20 may be sequentially arranged between the light-incident surface and the light-exit surface. In other words, the first layer EM10 and the second layer EM20 may be sequentially arranged along a direction in which incident light travels. Alternatively, numerical orders of the plurality of material layers EM10 and EM20 may be differently determined, taking account into an order in which they are stacked on the substrate SUB10. That is, the material layer EM20 may be referred to as a first layer and the material layer EM10 may be referred to as a second layer according to the order in which they are stacked on the substrate SUB10. Herein, the material layers EM10 and EM20 are sequentially referred to as the first layer EM10 and the second layer EM20 according to the direction in which incident light travels.

The plurality of material layers EM10 and EM20 may be different epsilon-near-zero (ENZ) material layers. That is, the first material layer EM10 may be a first ENZ material layer and the second material layer EM20 may be a second ENZ material layer which is different from the first ENZ material layer. An ENZ material may be a material that has a permittivity (or dielectric constant) ε which is near zero at a certain wavelength. For example, when a permittivity ε of a material is less than 0.2 at a certain wavelength, the material may be an ENZ material at the wavelength. A wavelength $\lambda_1$ of incident light in a medium may be $\lambda/n$, where $\lambda$ denotes a wavelength of the incident light, and n denotes a refractive power of the medium. A speed v of the light in the medium may be represented as c/n, where c denotes the speed of the light in vacuum, and n denotes a refractive power of the medium. The permittivity ε and the refractive power n of the medium may have a relation of $\varepsilon=n^2$. Thus, when light causing the permittivity ε of the ENZ material to be substantially the same as zero is moving within the ENZ material, a wavelength of the light in the ENZ material may be almost infinite and the phase velocity of the light may be very large. In this connection, the ENZ material may exhibit unique optical characteristics. In the present exemplary embodiment, the characteristics of the ENZ material may be used.

When the plurality of material layers EM10 and EM20 are ENZ material layers, they may have different ENZ wavelengths. Here, the term "ENZ wavelength" means a wavelength of light causing the permittivity ε of the ENZ material to be substantially the same as zero. That is, the "certain wavelength" described above may be the ENZ wavelength. The characteristics of the ENZ material layer may vary according to the ENZ wavelength. The ENZ wavelength may vary according to a resonance frequency of the ENZ material. For example, the ENZ wavelength may correspond to a certain frequency adjacent to the resonance frequency. Thus, the plurality of material layers EM10 and EM20 may have different resonance frequencies. Since a resonance frequency corresponds to a resonance wavenumber, the plurality of material layers EM10 and EM20 may have different resonance wavenumbers. Each of the plurality of material layers EM10 and EM20 may have a thickness of, for example, about 10 nm to about 1000 nm. The thickness of each of the plurality of material layers EM10 and EM20 may be less than a wavelength of incident light.

In the present exemplary embodiment, the multi-band pass filter may further include an aperture-defining layer AL10 located on the light-incident surface of the filter layer FL10. The aperture-defining layer AL10 may define at least one aperture A10. The light-incident surface of the filter layer FL10 may be exposed via the at least one aperture A10. A plurality of apertures A10 may be provided to form an array. The at least one aperture A10 may have, for example, a slit shape. Thus, the plurality of apertures A10 may be a slit array. The plurality of apertures A10 may be arranged regularly but may be arranged irregularly in some cases.

The aperture-defining layer AL10 may be formed of a metal or a metallic material. For example, the aperture-defining layer AL10 may be formed of Au, Ag, Cu, Al, Ni, Co, W, Mo, Ti, Ta, Pt, Pd, Ir, or the like. However, the aperture-defining layer AL10 is not limited thereto and may be formed of various materials. Any metal or metallic material may be used as a material of the aperture-defining layer AL10. The aperture A10 may have a width less than a wavelength of incident light, i.e., a sub-wavelength width. The width of the aperture A10 may be about 5 nm to about 1000 nm, e.g., about 10 nm to about 500 nm. When a plurality of apertures A10 are provided, a distance (pitch) between two adjacent apertures A10 may be in an range between about 1 μm and about 10 μm. For example, the range may be between about 1.5 μm and about 6 μm. However, the width of the aperture A10 and the distance (pitch) between two adjacent apertures A10 are not limited thereto, and may be changed in some cases. The aperture-defining layer AL10 may have a thickness of, for example, about 30 nm to about 300 nm. The thickness of the aperture-defining layer AL10 may be less than a wavelength of incident light.

When the filter layer FL10 contains an ENZ material, ENZ characteristics of the filter layer FL10 may be well-revealed through the at least one aperture A10 of the aperture-defining layer AL10. More specifically, light may be strongly focused on a portion of the filter layer FL10 exposed via the at least one aperture A10, and the ENZ characteristics of the filter layer FL10 may be well-revealed by the focused light. In general, light cannot pass through an aperture (e.g., a slit) having a width less than a wavelength of the light (i.e., a sub-wavelength width). However, when an ENZ material is located below the aperture, light may be strongly focused on the ENZ material below the aperture and has a high transmittance (also referred to as transmission) at an ENZ point (i.e., at an ENZ wavelength). When the aperture has a slit shape, the light may be better concentrated onto the ENZ material. Also, surface plasmon may occur between the aperture-defining layer AL10 and the filter layer FL10 in a region corresponding to the at least one aperture A10. The surface plasmon may affect the transmittance characteristics (filtering characteristics) of the light passing through the filter layer FL10.

According to the present exemplary embodiment, light of a plurality of wavelength regions may be emitted by the plurality of material layers EM10 and EM20 of the filter layer FL10. In other words, multi-band light may be emitted by the plurality of material layers EM10 and EM20. When the first material layer EM10 is formed of an ENZ material suitable to transmit light of a first wavelength band and the second material layer EM20 is formed of an ENZ material suitable to transmit light of a second wavelength band, the filter layer FL10 including the first and second material layers EM10 and EM20 may transmit light of a multi-band including the first wavelength band and the second wavelength band. The first wavelength band and the second wavelength band may not overlap with each other, or may partially overlap with each other. Thus, an 'addition rule (plus rule)' for transmittance wavelengths may be applied to the multi-band pass filter. The 'addition rule (plus rule)' will be described in detail with reference to FIG. 4 below.

Since the 'addition rule (plus rule)' is applicable to the multi-band pass filter according to the present exemplary embodiment, the number of wavelength bands to be transmitted via the multi-band pass filter may be increased by increasing the number of unit layers (element layers) of the filter layer FL10.

Figure 2:
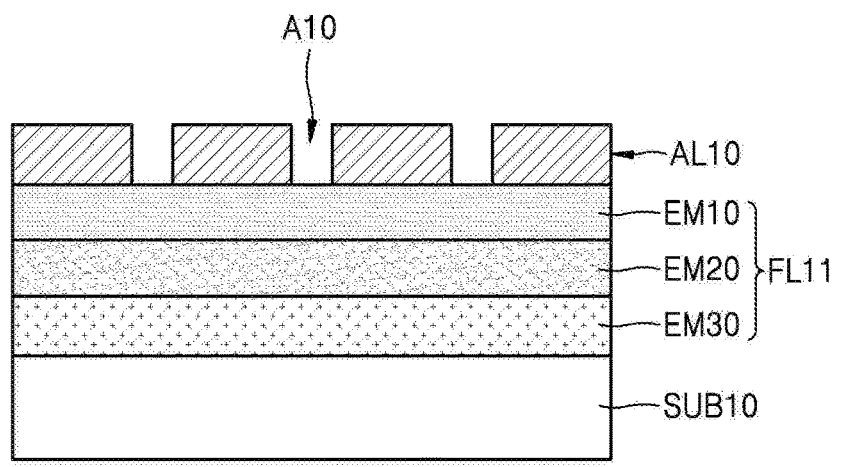
FIG. 2 is a cross-sectional view of a multi-band pass filter according to another exemplary embodiment.

FIG. 2 is a cross-sectional view of a multi-band pass filter according to another exemplary embodiment. The multi-band pass filter may include a filter layer FL11 including three different material layers EM10, EM20, and EM30.

Referring to FIG. 2, the filter layer FL11 may include the first material layer EM10, the second material layer EM20, and the third material layer EM30 which are sequentially arranged from a light-incident surface of the first layer FL11 to a light-exit surface thereof. The first material layer EM10 may be a first ENZ material layer. The second material layer EM20 may be a second ENZ material layer. The third material layer EM30 may be a third ENZ material layer. In this case, the first to third material layers EM10, EM20, and EM30 may have different resonance frequencies and different ENZ wavelengths. The first material layer EM10 may be a material layer suitable to transmit light of a first wavelength band. The second material layer EM20 may be material layer suitable to transmit light of a second wavelength band. The third material layer EM30 may be a material layer suitable to transmit light of a third wavelength band. The filter layer FL11 including the first to third material layers EM10, EM20, and EM30 may transmit light of a multi-band which includes the first wavelength band, the second wavelength band, and the third wavelength band. The first wavelength band, the second wavelength band, and the third wavelength band may not overlap with one another, or may partially overlap with one another.

Although FIGS. 1 and 2 illustrate the filter layer FL10 having a two-layer structure and the filter layer FL11 having a three-layer structure, a filter layer having four or more layer structure may be used.

In FIGS. 1 and 2, the substrate SUB10 may be formed of a material having a high transmittance property with respect to light of a wavelength region of interest and having a constant (or a hardly variable) refractive index in the wavelength region of interest. Any material satisfying the above conditions may be used to form the substrate SUB10.

In addition, light (i.e., incident light) incident on the multi-band pass filters of FIGS. 1 and 2 may include, for example, light of a mid-infrared (MIR) region. In this case, the plurality of material layers EM10, EM20, and EM30 of the filter layers FL10 and FL11 may each have an ENZ wavelength that is in a mid-infrared range. A mid-infrared wavelength range may be a range between about 2.5 μm and about 25 μm or a range between about 2.5 μm and about 20 μm. However, a wavelength range of incident light is not limited thereto. Also, the ENZ wavelengths of the plurality of material layers EM10, EM20, and EM30 may be present in a region other than the mid-infrared region.

The 'addition rule (plus rule)' described above may not be applicable to a related art band pass filter and thus a multi-band pass filter may be difficult to be realized. The related art band pass filter will be described with reference to FIG. 3 below.

Figure 3:
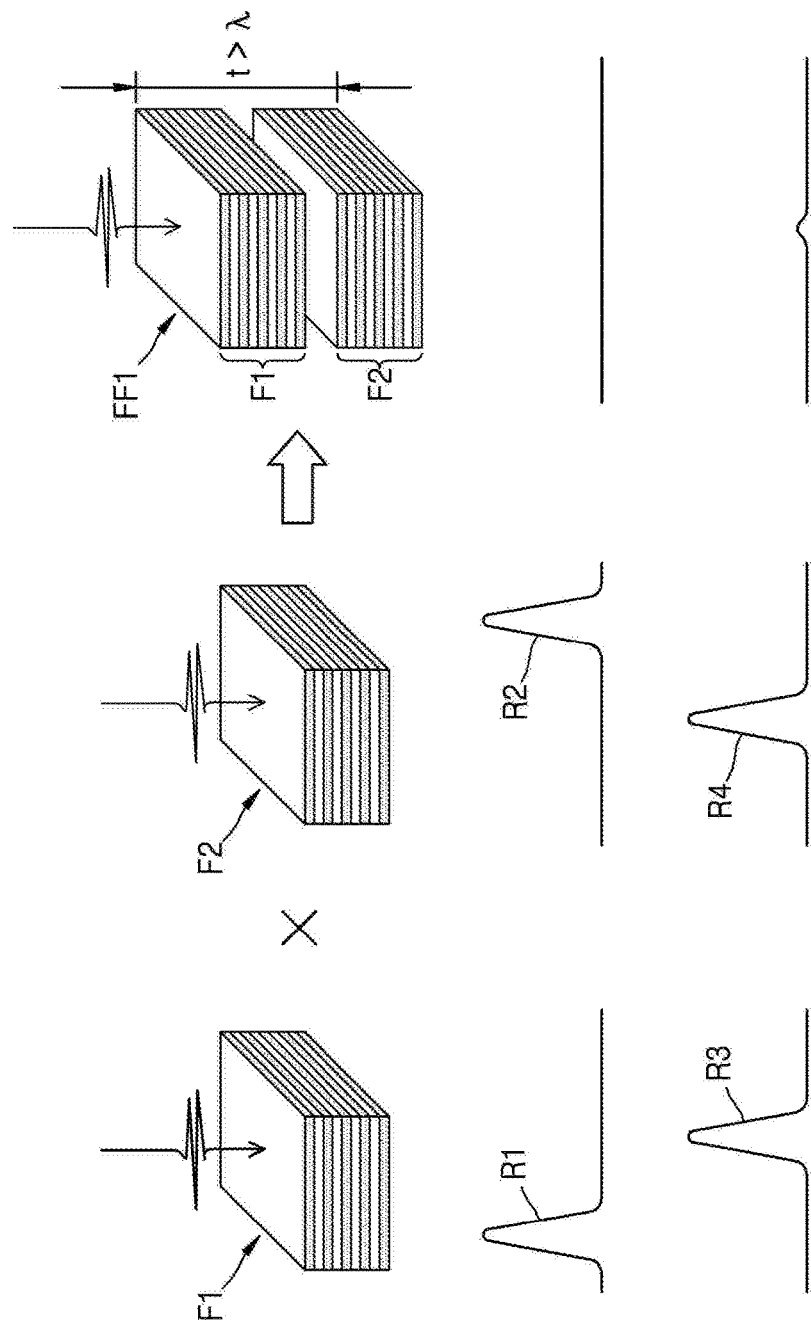
FIG. 3 is a conceptual diagram of a comparative example for explaining a rule applied to a related art band pass filter.

FIG. 3 is a conceptual diagram of a comparative example for explaining a rule applied to a band pass filter.

Referring to FIG. 3, a multiple filter structure FF1 may be manufactured by combining a first band pass filter F1 configured to transmit a first wavelength band R1 and a second band pass filter F2 configured to transmit a second wavelength band R2. The first wavelength band R1 and light of the second wavelength band R2 may not overlap with each other. In this case, light of the first wavelength band R1 may not pass through the second band pass filter F2, and light of the second wavelength band R2 may not pass through the first band pass filter F1. Consequently, the multiple filter structure FF1 may not transmit both of the lights of the first and second wavelength bands R1 and R2. If the first band pass filter F1 is configured to transmit a third wavelength band R3, the second band pass filter F2 is configured to transmit a fourth wavelength band R4, and a portion of the third wavelength band R3 and a portion of the fourth wavelength band R4 overlap each other, the multiple filter structure FF1 may transmit only a wavelength of a band corresponding to the overlapping region.

A rule applied to the band pass filter of FIG. 3 may be a 'multiplication rule'. For example, when a transmittance of light of the first wavelength band R1 transmitted by the first band pass filter F1 is 0.8 and a transmittance of light of the first wavelength band R1 transmitted by the second band pass filter F2 is 0, and therefore, the light of the first wavelength band R1 is not transmitted by the second band pass filter F2, the transmittance of the bandpass filter may be obtained by multiplying 0.8 and 0, which amounts to 0 (i.e., 0.8×0=0). Thus, the multiple filter structure FF1 cannot transmit the light of the first wavelength band R1. Also, when a transmittance of light of the second wavelength band R2 transmitted by the second band pass filter F2 is 0.8 and a transmittance of light of the second wavelength band R2 transmitted by the first band pass filter F1 is 0, therefore, the light of the second wavelength band R2 is not transmitted by the first band pass filter F1, the transmittance of the bandpass filter may be obtained by multiplying 0.8 and 0, which amounts to 0 (i.e., 0.8×0=0). Thus, the multiple filter structure FF1 cannot transmit the light of the second wavelength band R2. Consequently, the multiple filter structure FF1 cannot transmit both of the lights of the first and second wavelength bands R1 and R2. Thus, the band pass filter may not transmit light of a multi-band and therefore may not be used to implement a multi-band pass filter.

Also, the band pass filter, i.e., the first and second band pass filters F1 and F2, uses a large number of relatively thick dielectric layers and may thus have a large thickness of several tens of millimeters (mm). Thus, the multiple filter structure FF1 may have a thickness which is far greater than a wavelength of incident light and it may be thus difficult to apply the multiple filter structure FF1 to small and thin devices.

Figure 4:
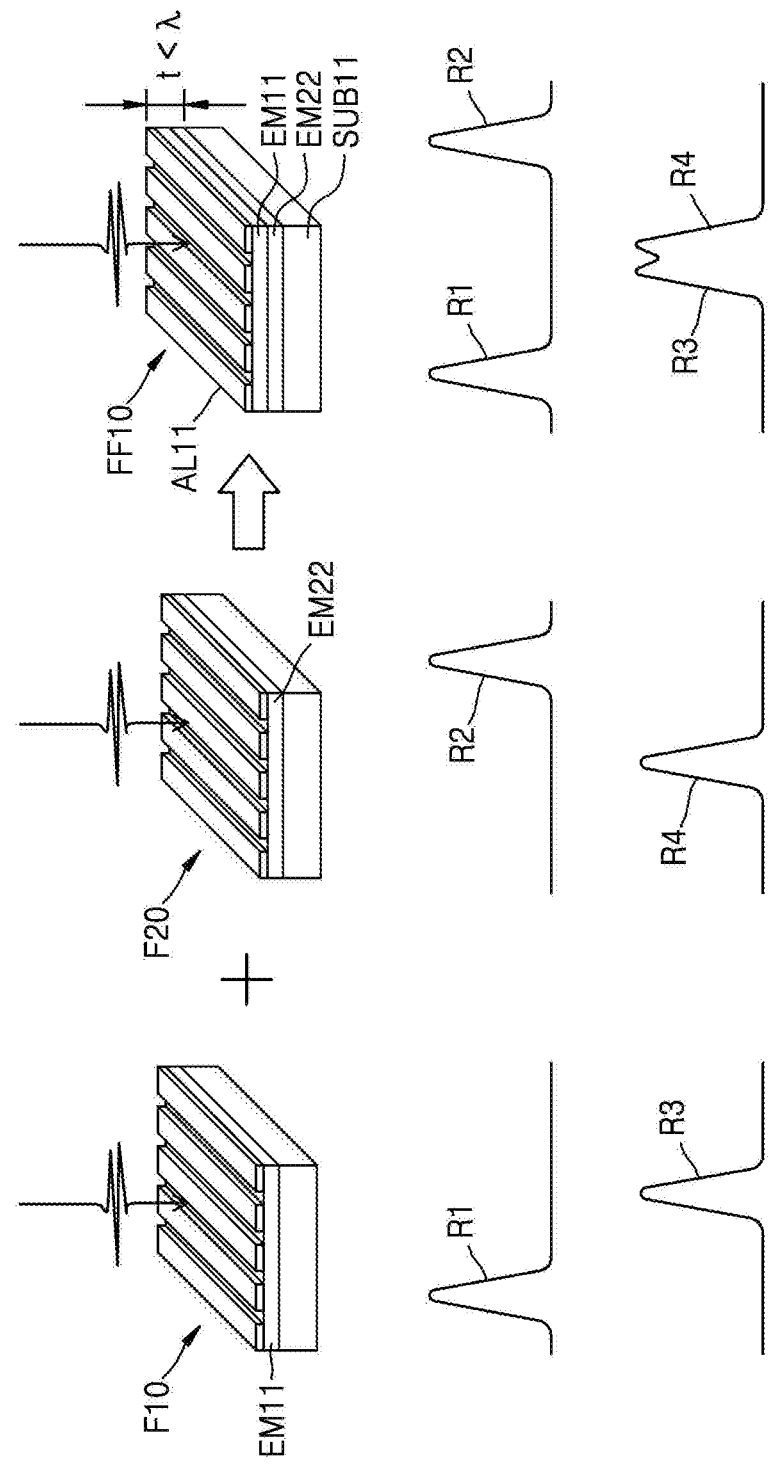
FIG. 4 is a conceptual diagram for explaining a rule applied to a multi-band pass filter according to an exemplary embodiment.

FIG. 4 is a conceptual diagram for explaining a rule applied to a multi-band pass filter according to an exemplary embodiment.

Referring to FIG. 4, a multi-band pass filter FF10 may include a first band pass filter F10 configured to transmit a first wavelength band R1 and a second band pass filter F20 configured to transmit a second wavelength band R2. The first band pass filter F10 may include a first material layer EM11. The second band pass filter F20 may include a second material layer EM22. The multi-band pass filter FF10 may include a stack structure (or a filter layer) in which the first and second material layers EM11 and EM22 are stacked. The stack structure of the first and second material layers EM11 and EM22 may be disposed between a substrate SUB11 and an aperture-defining layer AL11. The structure of the multi-band pass filter FF10 may be substantially the same as or similar to the structure of the multi-band pass filter of FIG. 1. The multi-band pass filter FF10 may transmit both of light of the first wavelength band R1 and light of the second wavelength band R2. The first wavelength band R1 and the second wavelength band R2 may not overlap with each other. If the first band pass filter F10 is configured to transmit light of a third wavelength band R3, the second band pass filter F20 is configured to transmit light of a fourth wavelength band R4, and a region of the third wavelength band R3 and a region of the fourth wavelength band R4 overlap each other, the multi-band pass filter FF10 may be configured to transmit not only the overlapping region but also a whole region (almost a whole region) of the third and fourth wavelength bands R3 and R4.

A rule applied to the multi-band pass filter FF10 may be referred to as an 'addition rule (plus rule)'. Light of a multi-band R1 and R2 which is the sum of light of the first wavelength band R1 and light of the second wavelength band R2 may be transmitted via the multi-band pass filter FF10. The 'addition rule (plus rule)' may be totally different from the multiplication rule applied to the band pass filter described above with reference to FIG. 3.

The multi-band pass filter FF10 according to an exemplary embodiment may have a very thin thickness. The sum of the thicknesses of the filter layers EM11 and EM22 and the aperture-defining layer AL11 except for the thickness of the substrate SUB11 may be less than a wavelength of incident light, and thus a filter having a sub-wavelength thickness may be manufactured. The sum of the thicknesses of the filter layers EM11 and EM22 and the aperture-defining layer AL11 may be less than a wavelength of incident light, and may be far less than the wavelength of the incident light in some cases. Even if the thickness of the substrate SUB11 is also taken into account, the multi-band pass filter FF10 may have a thin thickness of several tens of micrometers (μm) or less. The thickness of the multi-band pass filter FF10 may be about 1000 times less than the thickness of the existing filters having a thickness of several tens of millimeters (mm). Thus, the multi-band pass filter FF10 according to an exemplary embodiment may be easily applicable to thin film type/small-sized devices. In other words, the multi-band pass filter FF10 according to an exemplary embodiment is applicable to manufacturing various electronic devices and optical devices in a small size or in a thin film.

Figure 5:
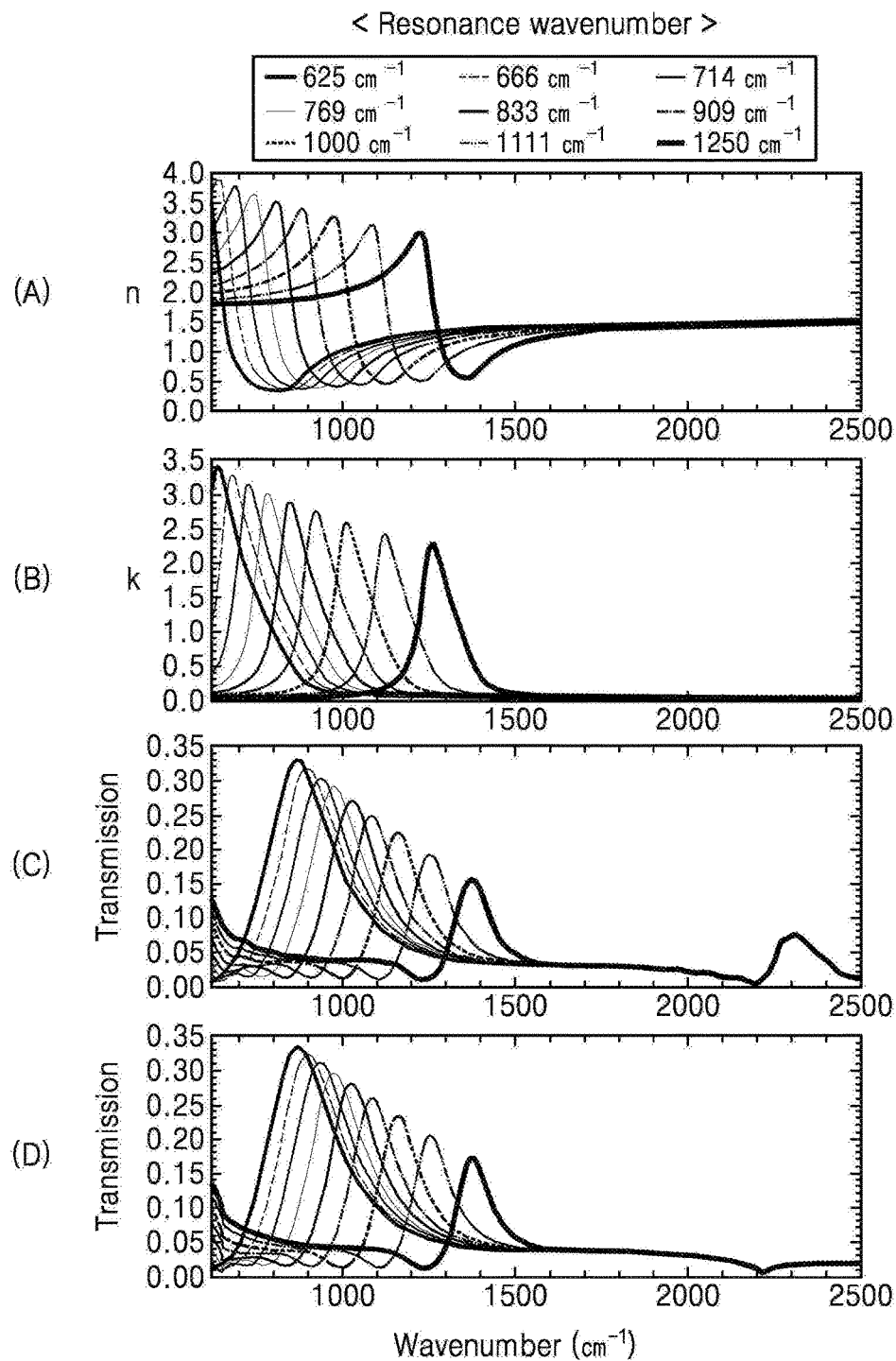
FIG. 5 is graphs showing a change in a refractive index and a change in a transmittance versus a change in a wavenumber of incident light with respect to filters to which material layers having different resonance wavenumbers are independently applied.

FIG. 5 is graphs showing a change in a refractive index (n, k) and a change in a transmission versus a change in a wavenumber of incident light with respect to filters to which material layers having different resonance wavenumbers are independently applied. A change in a refractive index (n, k) and a change in a transmission of each filter were estimated when each of an ENZ material having a resonance wavenumber of 625 $cm^{-1}$, an ENZ material having a resonance wavenumber of 666 $cm^{-1}$, an ENZ material having a resonance wavenumber of 714 $cm^{-1}$, an ENZ material having a resonance wavenumber of 769 $cm^{-1}$, an ENZ material having a resonance wavenumber of 833 $cm^{-1}$, an ENZ material having a resonance wavenumber of 909 $cm^{-1}$, an ENZ material having a resonance wavenumber of 1000 $cm^{-1}$, an ENZ material having a resonance wavenumber of 1111 $cm^{-1}$, and an ENZ material having a resonance wavenumber of 1250 $cm^{-1}$ was applied as the first material layer EM11 of the first band pass filter F10 of FIG. 4. Here, the resonance wavenumber may correspond to resonance frequency. The resonance wavenumber may be also referred to as a binding wavenumber.

A graph (A) of FIG. 5 shows a real number n of the refractive index. A graph (B) of FIG. 5 shows an imaginary value k of the refractive index. A graph (C) of FIG. 5 shows a change in the transmission through a finite-difference time-domain (FDTD) simulation. A graph (D) of FIG. 5 shows a change in a transmission through analytic calculation.

Referring to the graph (A) of FIG. 5, points (wavenumbers) at which the real number n of the refractive index approximates zero are present. The positions of the points may vary according to a resonance wavenumber. As the resonance wavenumber increases, the points (wavenumbers) at which the real number n of the refractive index approximates zero may be shifted to the right.

Referring to the graph (B) of FIG. 5, points (wavenumbers) at which the imaginary value k of the refractive index is maximum may be present. The positions of the points may correspond to or be substantially the same as a resonance wavenumber. As the resonance wavenumber increase, the points (wavenumbers) at which the imaginary value k of the refractive index is maximum may be shifted to the right.

Referring to the graph (C) of FIG. 5, a point (wavenumber) at which a transmittance is maximum may occur in each transmission curve corresponding to each resonance wavenumber. The positions of the points (wavenumbers) may vary according to a resonance wavenumber. The points may be ENZ wavenumbers corresponding to ENZ wavelengths. Also, the points may correspond to points at which real numbers n of the refractive index shown in the graph (A) of FIG. 5 and imaginary values k of the refractive index shown in the graph (B) of FIG. 5 coincide. For example, when a resonance wavenumber is 1250 $cm^{-1}$, a point at which a corresponding curve of the graph (A) of FIG. 5 and a corresponding curve of the graph (B) of FIG. 5 coincide may be a point on the graph (C) of FIG. 5 corresponding to maximum values of the corresponding curves. Since a point (wavenumber) at which a real number n and an imaginary value k of the refractive index are the same is an ENZ point (wavenumber), a maximum transmittance occurs at the ENZ point. A peak in a region 2200 to 2500 $cm^{-1}$ of the graph (C) of FIG. 5 may be noise peak.

A result of the graph (D) of FIG. 5 is substantially the same as a result of the graph (C) of FIG. 5. This means that result of the graph (D) of FIG. 5 obtained through analytic calculation is substantially the same as the result of the graph (C) of FIG. 5 obtained through the FDTD simulation.

Figure 6:
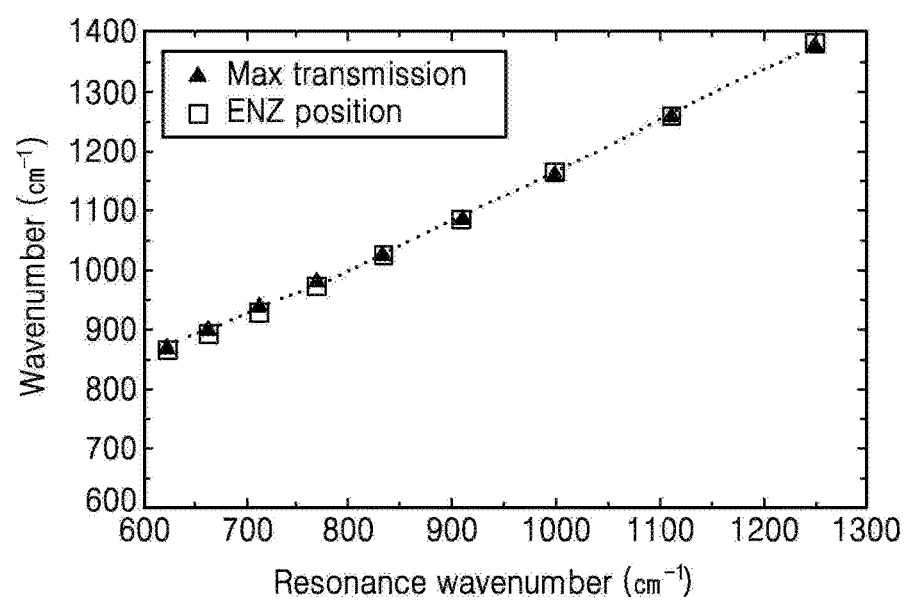
FIG. 6 is a graph showing the relationship between a maximum transmission point and an epsilon-near-zero (ENZ) point according to a resonance wavenumber.

FIG. 6 is a graph showing the relationship between a maximum transmission point and an ENZ point according to a resonance wavenumber. In FIG. 6, the maximum transmission point was obtained from the graph (C) of FIG. 5.

Referring to FIG. 6, the maximum transmission points substantially coincide with the ENZ points. It may be said that ENZ characteristics of an ENZ material may perform an important (decisive) role when light passes through an aperture (e.g., a slit) having a sub-wavelength width. That is, light may be transmitted at a certain wavelength (a reciprocal number of a wavenumber) by the characteristics of the ENZ material. Also, it can be known from the result of FIG. 6 that as a resonance wavenumber increases, the ENZ point (wavenumber) and the maximum transmission point (wavenumber) corresponding thereto increase. The ENZ point (wavenumber) and the maximum transmission point (wavenumber) may be in direct proportion to each other.

Figure 7:
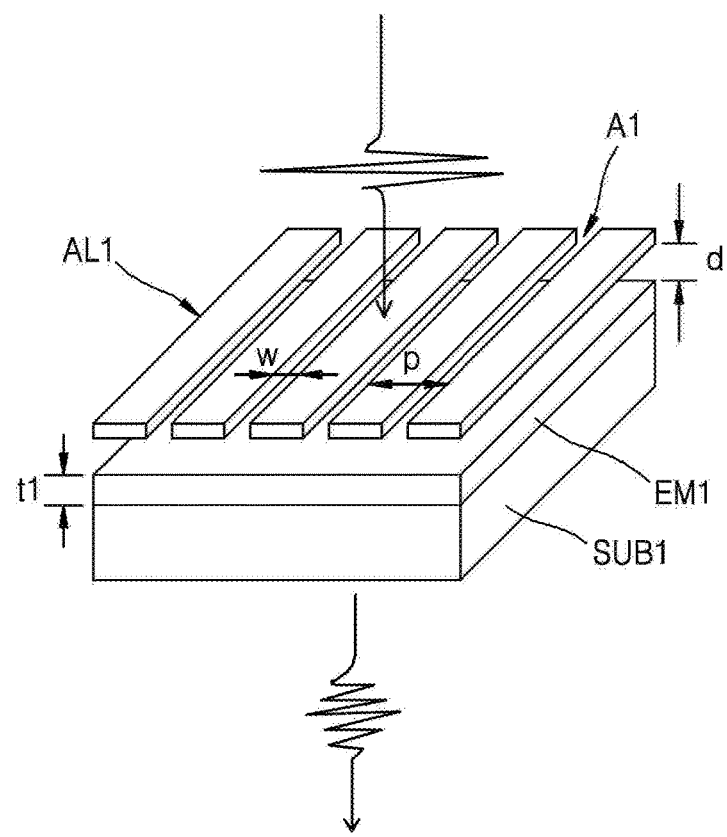
FIG. 7 is a conceptual diagram illustrating a filter structure for measuring a change in filter characteristics according to a change in a distance between a unit material layer constituting a filter layer and an aperture-defining layer located on the unit material layer.

FIG. 7 is a conceptual diagram illustrating a filter structure for measuring a change in features according to a change in a distance between a unit material layer EM1 constituting a filter layer and an aperture-defining layer AL1 located on the unit material layer EM1.

Referring to FIG. 7, the unit material layer EM1 may be located on a substrate SUB1. The aperture-defining layer AL1 may be located on the unit material layer EM1 to be spaced by a distance d from the unit material layer EM1. The distance d between the unit material layer EM1 and the aperture-defining layer AL1 may be an air gap. The aperture-defining layer AL1 may include a plurality of apertures A1 each having a slit shape. A reference 'w' denotes the width of the plurality of apertures A1. A reference 'p' denotes a pitch between the plurality of apertures A1. A reference 't1' denotes the thickness of the unit material layer EM1.

Figure 8:
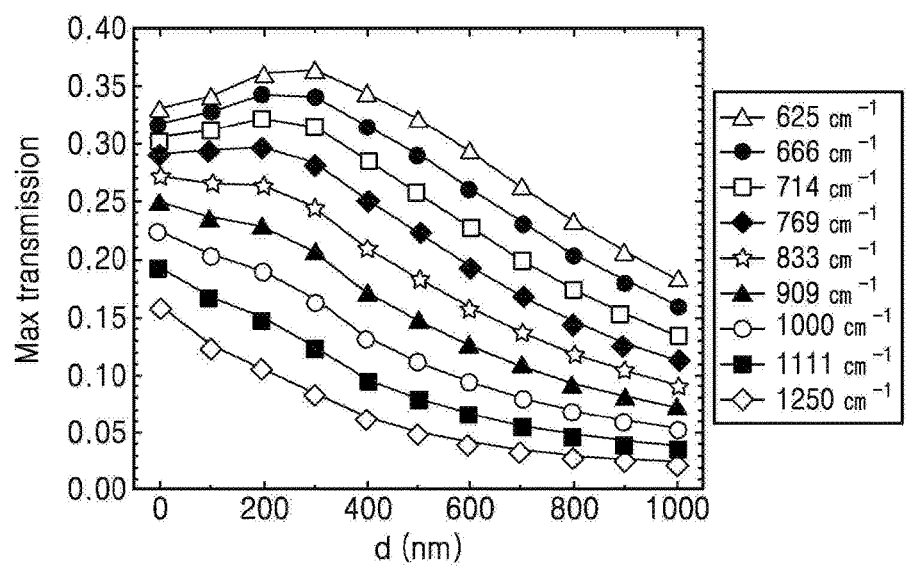
FIG. 8 is a graph showing a change in a maximum transmittance versus a change in the distance between the unit material layer and the aperture-defining layer in the filter structure of FIG. 7.

FIG. 8 is a graph showing a change in a maximum transmittance versus a change in the distance d between the unit material layer EM1 and the aperture-defining layer AL1 in the filter structure of FIG. 7. Here, a result of applying, to the unit material layer EM1, each of an ENZ material having a resonance wavenumber of 625 $cm^{-1}$, an ENZ material having a resonance wavenumber of 666 $cm^{-1}$, an ENZ material having a resonance wavenumber of 714 $cm^{-1}$, an ENZ material having a resonance wavenumber of 769 $cm^{-1}$, an ENZ material having a resonance wavenumber of 833 $cm^{-1}$, an ENZ material having a resonance wavenumber of 909 $cm^{-1}$, an ENZ material having a resonance wavenumber of 1000 $cm^{-1}$, an ENZ material having a resonance wavenumber of 1111 $cm^{-1}$, and an ENZ material having a resonance wavenumber of 1250 $cm^{-1}$, the maximum transmission of each of the ENZ materials is estimated.

Referring to FIG. 8, a transmittance is relatively high when the distance d is zero (i.e., when the unit material layer EM1 and the aperture-defining layer AL1 are in contact with each other). When the resonance wavenumber is 625 $cm^{-1}$, 666 $cm^{-1}$, 714 $cm^{-1}$, or 769 $cm^{-1}$, the transmission slightly increases and then decreases as the distance d increases from zero. When the resonance wavenumber is 833 $cm^{-1}$, 909 $cm^{-1}$, 1000 $cm^{-1}$, 1111 $cm^{-1}$ or 1250 $cm^{-1}$, the transmission continuously decreases as the distance d increases from zero. In particular, when the resonance wavenumber is 625 $cm^{-1}$, 666 $cm^{-1}$, 714 $cm^{-1}$, or 769 $cm^{-1}$, the maximum transmittance increases until the distance d became about 200 nm. When the resonance wavenumber is 625 $cm^{-1}$, a maximum transmittance at the distance d of about 450 nm and a maximum transmittance at the distance d of zero (i.e., the unit material layer EM1 and the aperture-defining layer AL1 are in contact with each other) are substantially the same to each other. When the resonance wavenumber is 666 $cm^{-1}$, a maximum transmittance at the distance d of about 400 nm and a maximum transmittance at the distance d of zero (i.e., when the unit material layer EM1 is in contact with the aperture-defining layer AL1) are substantially the same to each other, and when the resonance wavenumber is 714 $cm^{-1}$, a maximum transmittance at the distance d of about 350 nm and a maximum transmittance at the distance d of zero (i.e., when the unit material layer EM1 is in contact with the aperture-defining layer AL1) are substantially the same to each other.

It is noted from the result of FIG. 8 that even when the unit material layer EM1 and the aperture-defining layer AL1 are spaced apart from each other, an optical coupling between them may be maintained. In some cases, when the unit material layer EM1 and the aperture-defining layer AL1 are spaced apart from each other by a predetermined distance, higher transmission characteristics may be obtained when comparing to a case where the unit material layer EM1 and the aperture-defining layer AL1 are in contact with each other. Thus, even if the aperture-defining layer AL10 is spaced apart from the second material layer EM20 as in the exemplary embodiment of FIG. 1, an optical coupling may be maintained therebetween and filtering characteristics may be secured by the second material layer EM20. Similarly, even if the aperture-defining layer AL10 is spaced apart from the second and third material layers EM20 and EM30 as in the exemplary embodiment of FIG. 2, filtering characteristics may be secured by the second and third material layers EM20 and EM30.

Figure 9:
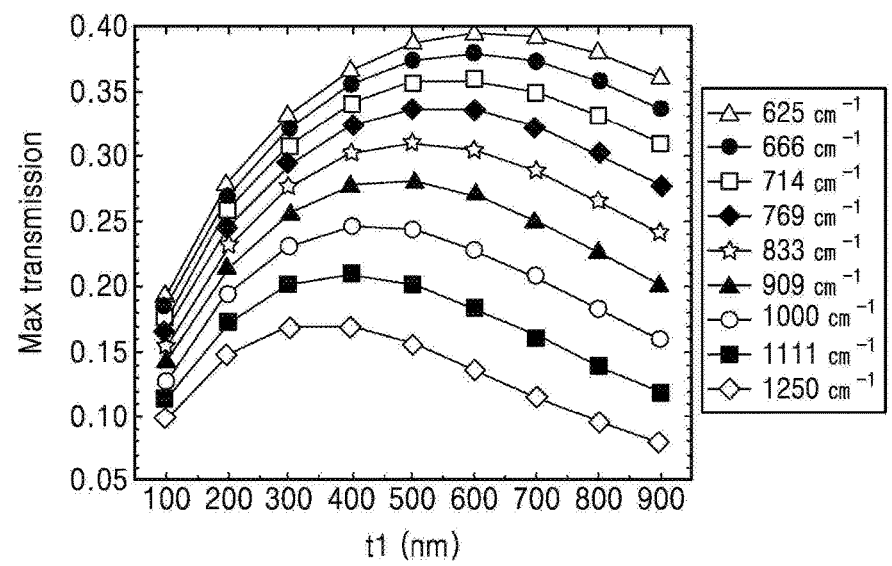
FIG. 9 is a graph showing a change in a maximum transmittance versus a change in the thickness of the unit material layer in the filter structure of FIG. 7.

FIG. 9 is a graph showing a change in a maximum transmittance versus a change in the thickness t1 of the unit material layer EM1 in the filter structure of FIG. 7. Here, the distance d is set to be 0 nm. That is, while the unit material layer EM1 and the aperture-defining layer AL10 are in contact with each other, a change in a maximum transmittance is estimated while changing the thickness t1 of the unit material layer EM1. Similar to the exemplary embodiment of FIG. 8, ENZ materials having various resonance wavenumbers are evaluated.

Referring to FIG. 9, as the thickness t1 of the unit material layer EM1 increases, the maximum transmittance increases and then decreases. Also, as a resonance wavenumber decreases, a thickness point of the unit material layer EM1 at which the maximum transmittance began to decrease increases. Thus, the characteristics of a multi-band pass filter may be controlled by adjusting the thickness t1 of the unit material layer EM1. An optimum thickness of the unit material layer EM1 may be appropriately selected according to a resonance wavenumber (or a resonance frequency corresponding to the resonance wavenumber) of the unit material layer EM1. For example, as a resonance wavenumber of the unit material layer EM1 decreases, a thickness of the unit material layer EM1 sufficient to secure a maximum transmittance may increase. The resonance wavenumber may be in direct proportion to the resonance frequency. Thus, as a resonance frequency of the unit material layer EM1 decreases, a thickness of the unit material layer EM1 sufficient to secure the maximum transmittance may increase. In this relation, the thicknesses of the first and second material layers EM10 and EM20 of FIG. 1 may be differently controlled, and the thicknesses of the first to third material layers EM10, EM20, and EM30 of FIG. 2 may be also differently controlled, as will be described in more detail with reference to FIGS. FIGS. 15 and 16 later.

Figure 10:
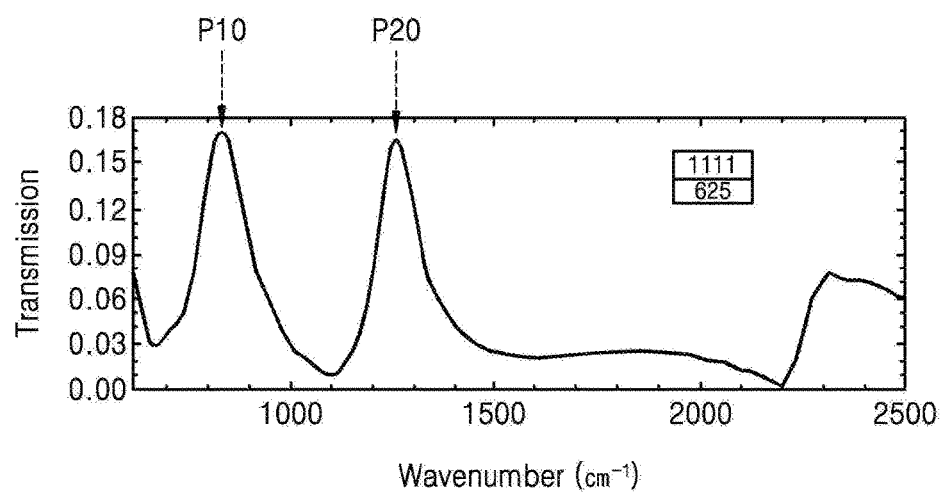
FIGS. 10 to 13 are graphs showing optical transmission characteristics of multi-band pass filters according to various exemplary embodiments.
Figure 11:
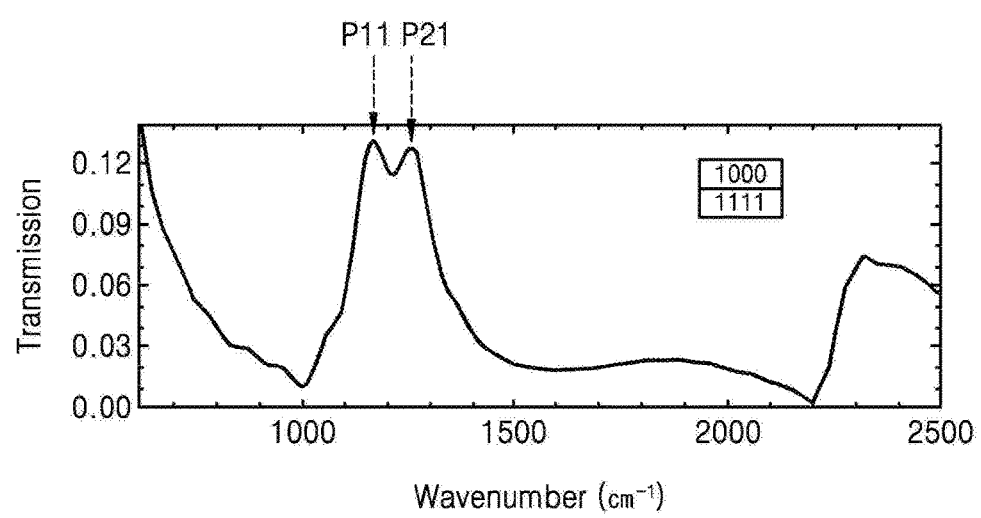
Figure 12:
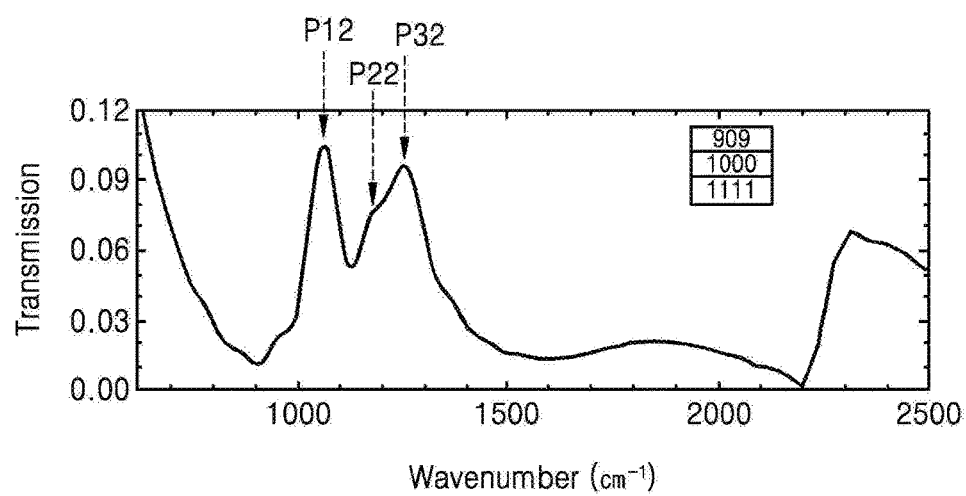
Figure 13:
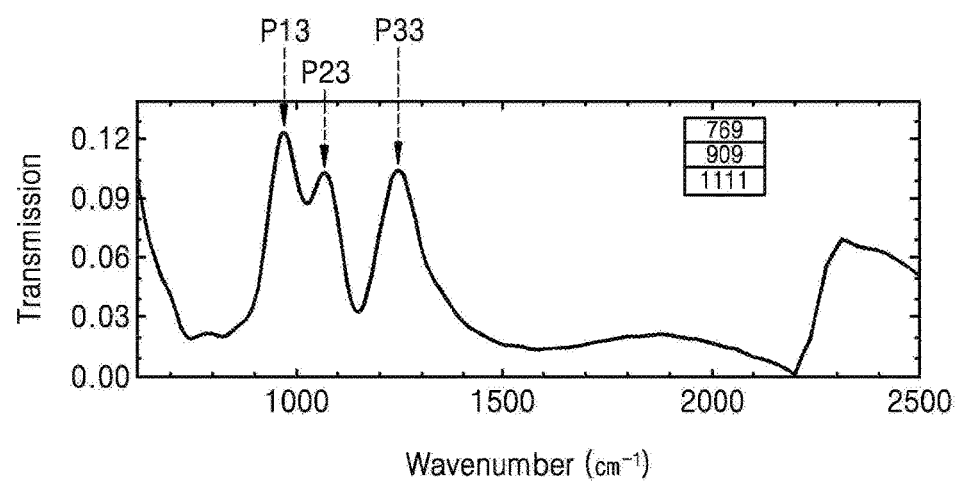

FIGS. 10 to 13 are graphs showing optical transmission characteristics of multi-band pass filters according to various exemplary embodiments, in which corresponding filter layers having a multi-layer structure are schematically illustrated. FIG. 10 illustrates a result of using a filter layer in which a first material layer having a resonance wavenumber of 1111 cm$^{-1}$ and a second material layer having a resonance wavenumber of 625 cm$^{-1}$ are stacked. FIG. 11 illustrates a result of using a filter layer in which a first material layer having a resonance wavenumber of 1000 cm$^{-1}$ and a second material layer having a resonance wavenumber of 1111 cm$^{-1}$ are stacked. FIG. 12 illustrates a result of using a filter layer in which a first material layer having a resonance wavenumber of 909 cm$^{-1}$, a second material layer having a resonance wavenumber of 1000 cm$^{-1}$, and a third material layer having a resonance wavenumber of 1111 cm$^{-1}$ are stacked. FIG. 13 illustrates a result of using a filter layer in which a first material layer having a resonance wavenumber of 769 cm$^{-1}$, a second material layer having a resonance wavenumber of 909 cm$^{-1}$, and a third material layer having a resonance wavenumber of 1111 cm$^{-1}$ are stacked. The multi-band pass filters of FIGS. 10 and 11 have a structure corresponding to the structure of the multi-band pass filter of FIG. 1. The multi-band pass filters of FIGS. 12 and 13 have a structure corresponding to the structure of the multi-band pass filter of FIG. 2.

In the graphs of FIGS. 10 to 13, transmission peaks corresponding to resonance wavenumbers are shown. In FIG. 10, a first peak P10 is generated by the second material layer having the resonance wavenumber of 625 cm$^{-1}$ and a second peak P20 is generated by the first material layer having the resonance wavenumber of 1111 cm$^{-1}$. In FIG. 11, a first peak P11 is generated by the first material layer having the resonance wavenumber of 1000 cm$^{-1}$ and the second peak P21 is generated by the second material layer having the resonance wavenumber of 1111 cm$^{-1}$. The first peak P11 and the second peak P21 were located very closely to each other. As the first peak P11 and the second peak P21 are close to each other, a wave having the first peak P11 and a wave having the second peak P21 may partially overlap as shown in FIG. 11. In FIG. 12, a first peak P12 is generated by the first material layer having the resonance wavenumber of 909 cm$^{-1}$, a second peak P22 is generated by the first material layer having the resonance wavenumber of 1000 cm$^{-1}$, and a third peak P32 is generated by the first material layer having the resonance wavenumber of 1111 cm$^{-1}$. In FIG. 13, a first peak P13 is generated by the first material layer having the resonance wavenumber of 769 cm$^{-1}$, a second peak P23 is generated by the first material layer having the resonance wavenumber of 909 cm$^{-1}$, and a third peak P33 is generated by the first material layer having the resonance wavenumber of 1111 cm$^{-1}$.

It is noted from the results of FIGS. 10 to 13 that multi-band pass filters according to various exemplary embodiment have transmission characteristics in accordance with the 'addition rule (plus rule)'. Furthermore, optical transmission characteristics of a multi-band or a broadband pass filter in which a plurality of wavelength regions overlap each other or are continuous may be secured according to design conditions. Here, the broadband pass filter may be also a type of a multi-band pass filter.

Figure 14:
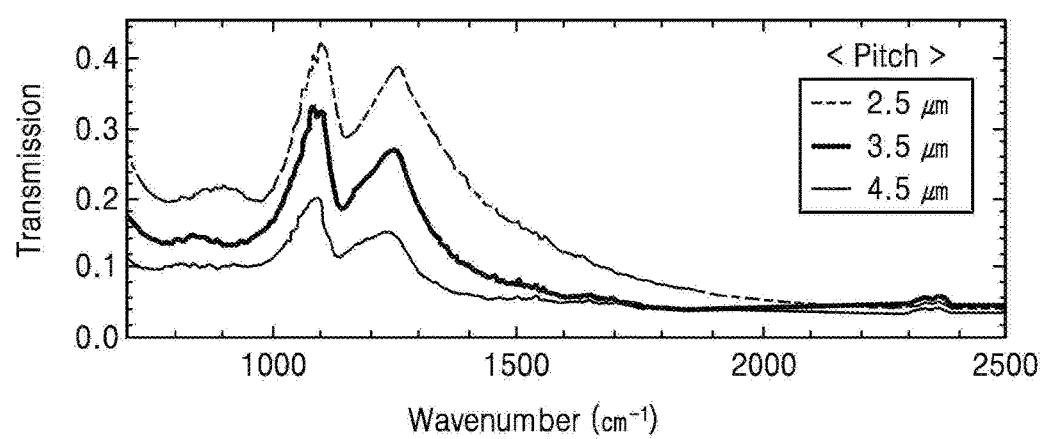
FIG. 14 is a graph showing a change in the optical transmission characteristics of a multi-band pass filter including a plurality of apertures according to a change in a pitch between the plurality of apertures, according to an exemplary embodiment.

FIG. 14 is a graph showing a change in the optical transmission characteristics of a multi-band pass filter including a plurality of apertures according to a change in a pitch between the plurality of apertures, according to an exemplary embodiment. FIG. 14 shows the optical transmission characteristics of the multi-band pass filter when the pitch between the plurality of apertures is 2.5 µm, 3.5 µm, and 4.5 µm. Here, the width of each of the plurality of apertures is about 500 nm. The multi-band pass filter includes two ENZ material layers having different resonance wavenumbers (resonance frequencies).

Referring to FIG. 14, as the pitch between the plurality of apertures changes, the height of the graph changes. This means that a maximum transmittance may vary according to the pitch between the plurality of apertures. Thus, the characteristics of the multi-band pass filter may be controlled by forming a plurality of apertures in an aperture-defining layer and adjusting a pitch between the plurality of apertures. An appropriate size of a pitch between the plurality of apertures may be selected according to desired filter characteristics. The result of FIG. 14 shows that filter characteristics may be more easily controlled when a plurality of apertures (e.g., slits) are used than when only one aperture (e.g., a slit) is used.

Referring to FIG. 14, even when a pitch between the plurality of apertures changes, X-axis positions (wavenumbers) of transmission peaks may not change. The X-axis positions (wavenumbers) of the transmission peaks may be determined by characteristics of material layers constituting a filter layer other than the pitch between the plurality of apertures.

As described above, according to exemplary embodiments, a multi-band pass filter may be manufactured to be easily designed according to desired characteristics. For example, in the structures of FIGS. 1 and 2, very various filtering characteristics may be easily secured by appropriately selecting materials and a number of a plurality of material layers that constitute a filter layer. In the case of a band pass filter according to related art, an independent design process may be performed according to a target transmittance wavelength. Also, a multi-band pass filter may not be easily manufactured by using the band pass filter according to the related art. In contrast, the multi-band pass filter according to the present exemplary embodiment may have a simple design and a whole design thereof may not be largely changed according to transmittance wavelengths. Thus, a filter may be very easily designed according to desired characteristics. In this aspect, multi-band pass filters according to exemplary embodiments may be configurable filters. Also, the band pass filter according to the related art has a large thickness of several tens of millimeters (mm) but the multi-band pass filter according to the present exemplary embodiment may have a thickness of several tens of micrometers (μm) or less. Accordingly, multi-band pass filters according to exemplary embodiments may be small-sized (ultra-small sized) filters or thin film type filters.

Figure 15:
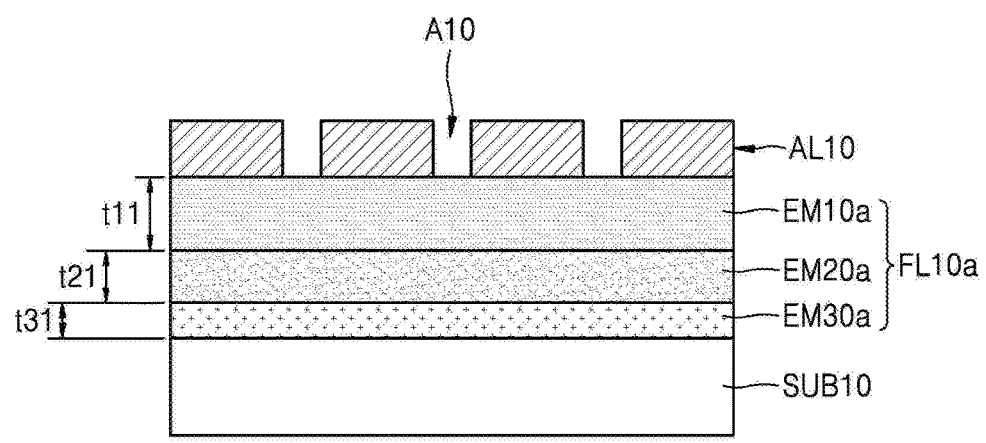
FIG. 15 is a cross-sectional view of a multi-band pass filter according to another exemplary embodiment.
Figure 16:
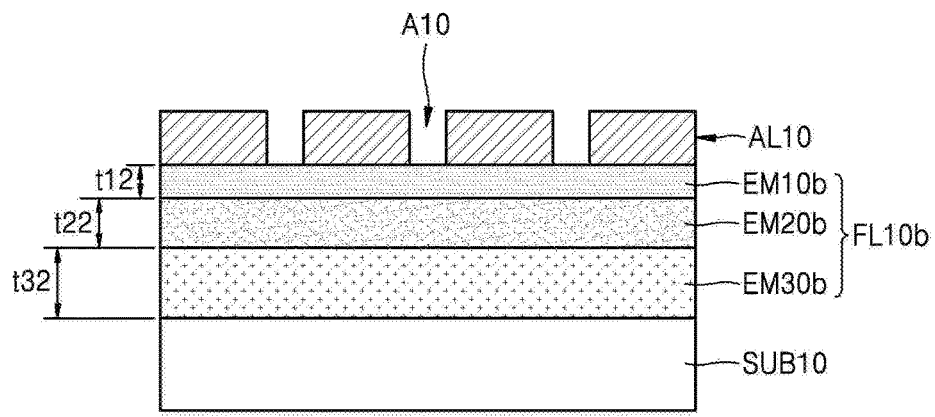
FIG. 16 is a cross-sectional view of a multi-band pass filter according to another exemplary embodiment.

According to another exemplary embodiment, thicknesses of a plurality of material layers that constitute a filter layer (filter unit) may be differently controlled as illustrated in FIGS. 15 and 16.

FIG. 15 is a cross-sectional view of a multi-band pass filter according to another exemplary embodiment.

Referring to FIG. 15, a filter layer FL10a may include a plurality of material layers EM10a, EM20b, and EM30a. At least two layers among the plurality of material layers EM10a, EM20b, and EM30a may have different thicknesses. For example, the first material layer EM10a may have a first thickness t11 and the second material layer EM20a may have a second thickness t21 which is less than the first thickness t11. Also, the third material layer EM30a may have a third thickness t31 which is less than the second thickness t21. In this case, a resonance frequency (or a resonance wavenumber) of the first material layer EM10a may be lower than a resonance frequency of the second material layer EM20a, and the resonance frequency (or the resonance wavenumber) of the second material layer EM20a may be lower than a resonance frequency of the third material layer EM30a. In other words, as a resonance frequency (or a resonance wavenumber) of a material layer increases, a thickness thereof may decrease. As described above with reference to FIG. 9, a material having a high resonance frequency (or resonance wavenumber) may have a relatively thin thickness so as to secure a high transmittance.

FIG. 16 is a cross-sectional view of a multi-band pass filter according to another exemplary embodiment.

Referring to FIG. 16, a filter layer FL10b may include a plurality of material layers EM10b, EM20b, and EM30b. The first material layer EM10b may have a first thickness t12. The second material layer EM20b may have a second thickness t22 which is greater than the first thickness t12. The third material layer EM30b may have a third thickness t32 which is greater than the second thickness t22. In this case, a resonance frequency (or a resonance wavenumber) of the first material layer EM10b) may be higher than a resonance frequency of the second material layer EM20b, and the resonance frequency (or the resonance wavenumber) of the second material layer EM20b may be higher than a resonance frequency of the third material layer EM30b.

The structures illustrated in FIGS. 15 and 16 are merely examples and the positions of the material layers EM10a, EM20a, EM30a, EM10b, EM20b, and EM30b may be variously changed. For example, the second material layers EM20a and EM20b which are middle layers may have a thickest thickness or a thinnest thickness. Alternatively, two layers among the material layers EM10a, EM20a, and EM30a and two layers among the material layers EM10b, EM20b, and EM30b may have the same thickness. In addition, the structures illustrated in FIGS. 15 and 16 may be variously changed.

Figure 17:
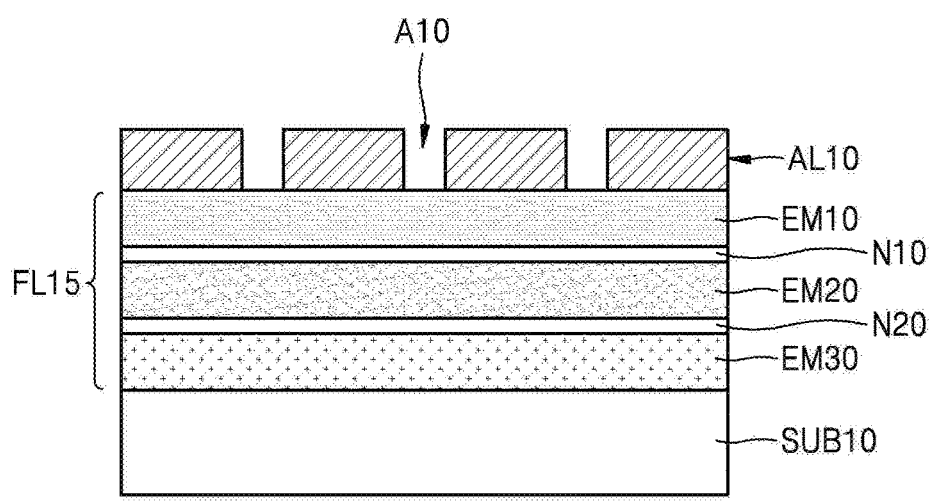
FIG. 17 is a cross-sectional view of a multi-band pass filter according to another exemplary embodiment.

FIG. 17 is a cross-sectional view of a multi-band pass filter according to another exemplary embodiment.

Referring to FIG. 17, a filter layer FL15 may further include at least one insertion layer between a plurality of material layers EM10, EM20, and EM30. For example, the filter layer FL15 may further include a first insertion layer N10 between the first material layer EM10 and the second material layer EM20, and a second insertion layer N20 between the second material layer EM20 and the third material layer EM30. Each of the first and second insertion layers N10 and N20 may be formed of a material with a thickness that may not substantially affect filtering characteristics (e.g., transmittance) of the multi-band pass filter. For example, each of the first and second insertion layers N10 and N20 may be formed of a material having high transmission characteristics with respect to light of a wavelength region of interest and having a constant (or hardly variable) refractive index in the wavelength region of interest. Any material satisfying the above conditions may be used to form the first and second insertion layers N10 and N20. An additional insertion layer may be further included between a substrate SUB10 and the third material layer EM30 and/or between the first material layer EM10 and an aperture-defining layer AL10.

Figure 18:
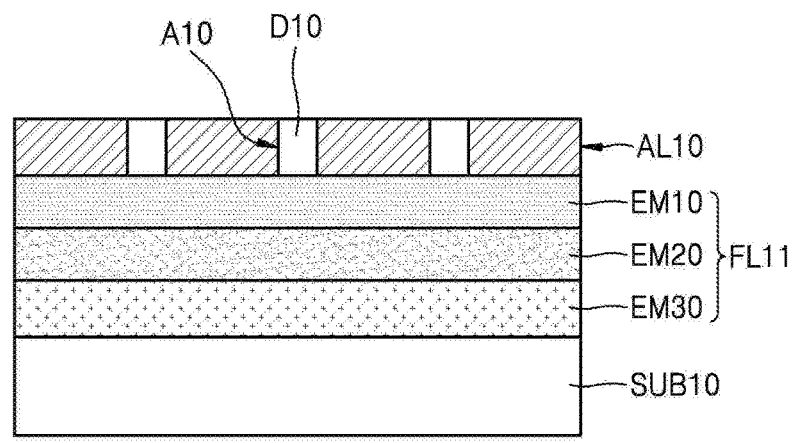
FIG. 18 is a cross-sectional view of a multi-band pass filter according to another exemplary embodiment.

FIG. 18 is a cross-sectional view of a multi-band pass filter according to another exemplary embodiment. The exemplary embodiment of FIG. 18 is a modified example of the exemplary embodiment of FIG. 2.

Referring to FIG. 18, an aperture-filling element D10 may be further included in each of apertures A10 of an aperture-defining layer AL10. The aperture-filling element D10 may be formed of a material having high transmission characteristics with respect to light of a wavelength region of interest and having a constant (or hardly variable) refractive index in the wavelength region of interest. Any material satisfying the above conditions may be used to form the aperture-filling element D10.

Figure 19:
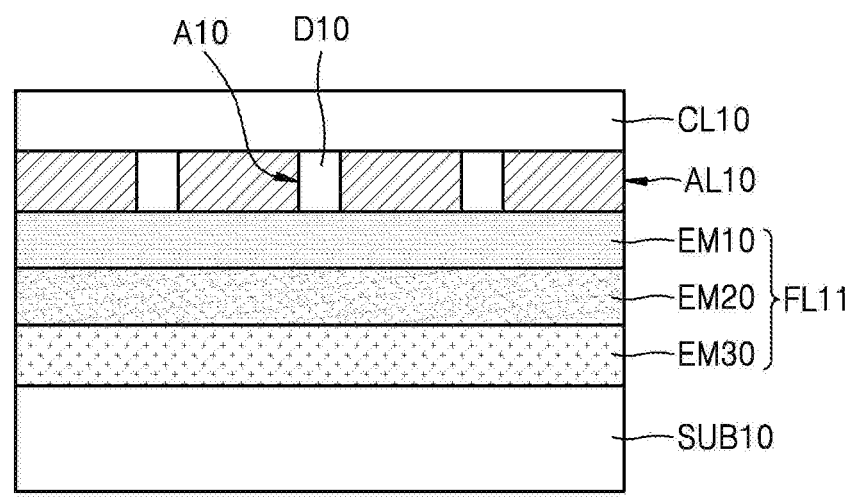
FIG. 19 is a cross-sectional view of a multi-band pass filter according to another exemplary embodiment.

According to another exemplary embodiment, a cover layer may be formed on the aperture-defining layer AL10 and the aperture-filling element D10 to cover the aperture-defining layer AL10 and the aperture-filling element D10. An example of the cover layer is illustrated in FIG. 19. Referring to FIG. 19, a cover layer CL10 may be formed on an aperture-defining layer AL10 and an aperture-filling element D10. Similar to the aperture-filling element D10, the cover layer CL10 may be formed of a material having high transmission characteristics with respect to light of a wavelength region of interest and having a constant (or hardly variable) refractive index in the wavelength region of interest. The cover layer CL10 may act as a protective layer.

Figure 20:
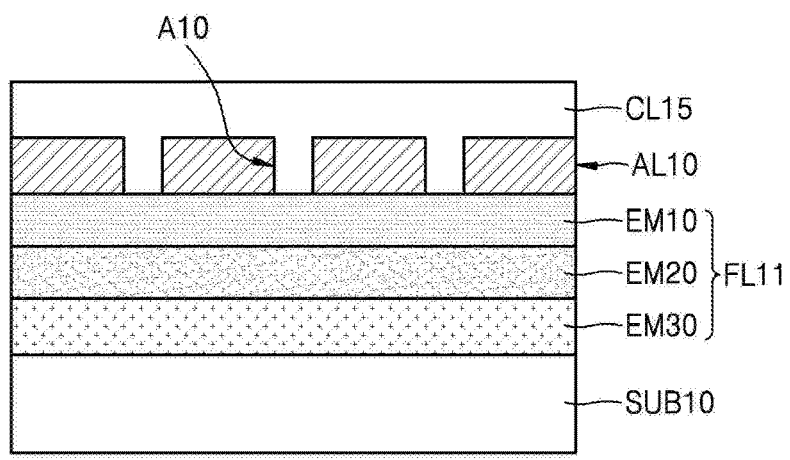
FIG. 20 is a cross-sectional view of a multi-band pass filter according to another exemplary embodiment.

According to another exemplary embodiment, the aperture-filling element D10 and the cover layer CL10 of FIG. 19 may be integrally formed of the same material, as illustrated in FIG. 20. Referring to FIG. 20, a cover layer CL15 filling an aperture A10 and covering an aperture-defining layer AL10 may be provided. The cover layer CL15 may be formed of the same or substantially the same material as the aperture-filling element D10 of FIG. 18 or the cover layer CL10 of FIG. 19.

Although FIGS. 18 to 20 illustrate cases in which the aperture-filling element D10 and the cover layers CL10 and CL15 are applied to the structure of FIG. 2, the aperture-filling element D10 and the cover layers CL10 and CL15 are also applicable to the structures of FIGS. 1 and 15 to 17 and modified examples of the structures.

A plurality of material layers applied to filter layers in multi-band pass filters according to various exemplary embodiments as described above will be described in more detail below.

When each of the plurality of material layers applied to the filter layers is an ENZ material layer, each of the plurality of material layers may be a single material layer. In this case, the plurality of material layers may be formed of a dielectric material, for example, SiN (e.g., $Si_3N_4$, $SiO_2$, $Al_2O_3$, $TiO_2$, etc.). These materials may have a crystalline phase for ENZ characteristics, unlike general amorphous dielectric materials. The dielectric materials having the crystalline phase may have a wavelength having a permittivity ε which approximates zero in, for example, a mid-infrared (MIR) region, i.e., an ENZ wavelength. However, the dielectric materials disclosed herein are merely examples and other various materials may be used.

Alternatively, at least one among the plurality of material layers applied to filter layers may include a meta-material. An ENZ material may be realized using the meta-material. Also, the meta-material may be applied to at least one among the plurality of material layers. The meta-material may include, for example, a metallic pattern array having a certain shape and a dielectric layer which is in contact with the metallic pattern array. The dielectric layer may be formed on the metallic pattern array or the metallic pattern array may be formed on the dielectric layer. The meta-material may have various configurations.

Alternatively, at least one among the plurality of material layers applied as filter layers may include two or more types of two-dimensional (2D) materials. An ENZ material may be formed using a combination of two or more types of 2D materials, and applied to at least one of the plurality of material layers. For example, an ENZ material may be formed using a structure in which graphene and hexagonal boron nitride (h-BN) are repeatedly and alternately stacked. In addition, an ENZ material formed using 2D materials may have various configurations. Since 2D materials have an extremely thin thickness, a thin filter layer may be obtained using the 2D materials.

Figure 21:
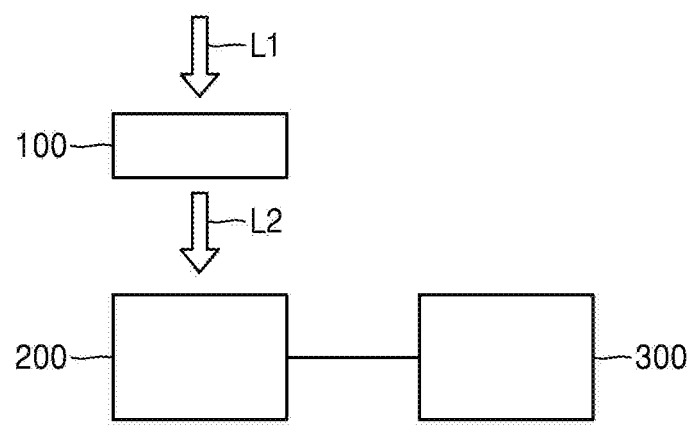
FIG. 21 is a conceptual diagram illustrating an electronic device (optical device) including a multi-band pass filter according to an exemplary embodiment.

FIG. 21 is a conceptual diagram illustrating an electronic device (optical device) including a multi-band pass filter 100 according to an exemplary embodiment.

Referring to FIG. 21, the multi-band pass filter 100 according to an exemplary embodiment may be provided. A structure of the multi-band pass filter 100 may be substantially the same as one of the structures as described above with reference to FIGS. 1, 2, and 15 to 20 or be modified from one of the structures. Incident light L1 may be emitted on the multi-band pass filter 100, and at least part of the incident light L1 may pass through the multi-band pass filter 100 and then emitted from the multi-band pass filter 100 as emitting light L2. The emitting light L2 may be light of a multiple wavelength band. A light-receiving element unit 200 configured to receive the emitting light L2 may be provided. A circuit unit 300 connected to the light-receiving element unit 200 may be further provided. The circuit unit 300 may include a controller.

Although FIG. 21 schematically illustrates the electronic device (optical device) including the multi-band pass filter 100, the electronic device (optical device) may have various and complicated structures according to the type thereof. The multi-band pass filter 100 may be embodied in the form of a chip, and installed in various electronic devices (optical devices), for example, a mobile phone, a display device (e.g., a television (TV)), a camera, etc. Also, the multi-band pass filter 100 is applicable to the field of various imaging devices. The multi-band pass filter 100 is applicable to various fields using an optical filter. An electronic device (an optical device) may be easily manufactured in a small size and a thin film by using the multi-band pass filter 100 according to an exemplary embodiment. Also, the multi-band pass filter 100 may be easily designed according to desired characteristics and be capable of securing very various filtering characteristics. Thus, the multi-band pass filter 100 may be applied to improve the performance of electronic devices (optical devices) and control characteristics of the electronic devices (optical devices).

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art. For example, it would be apparent to those of ordinary skill in the technical field that the structures of the multi-band pass filters described above with reference to FIGS. 1, 2, and 15 to 20 may be variously modified. For example, the shapes of the apertures A10 or the position of the aperture-defining layer AL10 may be differently set and the substrate SUB10 may be omitted in some cases. Also, the structure of the electronic device (optical device) including the multi-band pass filter described above with reference to FIG. 21 may be variously changed.

What is claimed is:

1. A multi-band pass filter comprising:
a filter layer comprising a plurality of epsilon-near-zero (ENZ) material layers that are sequentially arranged, the plurality of ENZ material layers each comprising an ENZ material having an approximate zero value of a permittivity at a given wavelength, and the plurality of ENZ material layers having ENZ wavelengths different from each other; and
an aperture-defining layer that is disposed on the filter layer and comprises at least one aperture,
wherein the filter layer is directly exposed to incident light through the at least one aperture, and is configured to pass a plurality of wavelength regions of the incident light, and
wherein material and thickness of each of the plurality of ENZ material layers are configured such that the plurality of ENZ material layers have different resonant frequencies and the multi-band pass filter transmits light of the plurality wavelength regions.

2. The multi-band pass filter of claim 1, wherein a sum of a thickness of the filter layer and a thickness of the aperture-defining layer is less than a wavelength of the incident light.

3. The multi-band pass filter of claim 1, wherein the plurality of wavelength regions are differentiated from a peak point included in each of the plurality of wavelength regions.

4. The multi-band pass filter of claim 1, wherein the plurality of ENZ material layers have resonance frequencies different from each other.

5. The multi-band pass filter of claim 1, wherein a thickness of the aperture-defining layer is equal to a thickness of the at least one aperture so that a portion of the filter layer is directly exposed to the incident light through the at least one aperture.

6. The multi-band pass filter of claim 1, wherein at least one among the plurality of ENZ material layers comprises a meta-material.

7. The multi-band pass filter of claim 1, wherein at least one among the plurality of ENZ material layers comprises two or more types of two-dimensional materials.

8. The multi-band pass filter of claim 1, wherein each of the plurality of ENZ material layers has a thickness of about 10 nm to about 1000 nm.

9. The multi-band pass filter of claim 1, wherein the plurality of ENZ material layers comprise:
a first ENZ material layer that has a first thickness and a first resonance frequency; and
a second ENZ material layer that has a second thickness less than the first thickness and a second resonance frequency greater than the first resonance frequency, and
wherein the first resonance frequency and the second resonance frequency correspond to at least two peak points of the plurality of wavelength regions.

10. The multi-band pass filter of claim 1, wherein the at least one aperture has a width less than a wavelength of the incident light.

11. The multi-band pass filter of claim 1, wherein the at least one aperture comprises a plurality of slits.

12. The multi-band pass filter of claim 11, wherein each of the plurality of slits has a width within a range between about 5 nm and about 1000 nm, and
a distance between two adjacent silts of the plurality of slits is within a range between about 1 µm and about 10 µm.

13. The multi-band pass filter of claim 1, wherein the aperture-defining layer comprises a metal or a metallic material.

14. The multi-band pass filter of claim 1, wherein the aperture-defining layer has a thickness within a range between about 30 nm and about 300 nm.

15. The multi-band pass filter of claim 1, wherein the plurality of ENZ material layers are sequentially stacked on a substrate that has a substantially constant refractive index in the plurality of wavelength regions of the incident light.

16. A multi-band pass filter comprising:
a filter comprising a plurality of material layers that are sequentially arranged; and
an aperture-defining layer that is disposed on the plurality of material layers and comprises at least one aperture,
wherein the plurality of material layers comprise a first material layer and a second material layer, the first material layer being configured to transmit light of a first wavelength band, the second material layer being configured to transmit light of a second wavelength band which is different from the first wavelength band, and
wherein the filter is directly exposed to incident light through the at least one aperture, and is configured to transmit the incident light of a plurality of wavelength bands comprising the first wavelength band and the second wavelength band,
wherein material and thickness of each of the first and the second material layers are configured such that the first and the second material layers have different resonant frequencies and the multi-band pass filter transmits light of the plurality wavelength bands,
wherein the plurality of material layers comprise a plurality of different ENZ material layers, and
wherein the first material layer is a first ENZ material layer, and the second material layer is a second ENZ material layer.

17. The multi-band pass filter of claim 16, wherein the first material layer has a first thickness, and the second material layer has a second thickness which is less than the first thickness,
wherein the first material layer has a first resonance frequency, and the second material layer has a second resonance frequency which is greater than the first resonance frequency, and
wherein the first resonance frequency and the second resonance frequency correspond to a peak point of the first wavelength band and a peak point of the second wavelength band, respectively.

18. The multi-band pass filter of claim 16, wherein the plurality of material layers comprise three or more material layers.

19. The multi-band pass filter of claim 16, wherein the at least one aperture comprises a plurality of slits.

20. The multi-band pass filter of claim 16, wherein the aperture-defining layer comprises a metal or a metallic material.

21. The multi-band pass filter of claim 16, wherein the plurality of material layers are sequentially stacked on a substrate that has a substantially constant refractive index in the first wavelength band and the second wavelength band.

* * * * *